UNITED STATES PATENT OFFICE.

FRANCIS C. BARTON, OF PHILADELPHIA, PENNSYLVANIA.

PLASTER COMPOSITION FOR DISSEMINATION.

1,099,961.　　　Specification of Letters Patent.　Patented June 16, 1914.

No Drawing.　　Application filed June 6, 1912.　Serial No. 701,983.

*To all whom it may concern:*

Be it known that I, FRANCIS C. BARTON, a citizen of the United States, residing in the city and county of Philadelphia, State of Pennsylvania, have invented a new and useful Plaster Composition for Dissemination, of which the following is a specification.

My invention consists of a new and useful product, consisting of a composition of matter for use in the dissemination of volatile disinfectants, deodorizers, perfumes, and consists of a material which forms a base or body and a controlling or regulating material or agent that will retard the dissemination concentrated or located at the surface thereof. The material forming the base or body is preferably composed of plaster of Paris and an argillaceous material, such as ocher or argillaceous or calcareous earth, and the controlling or regulating material or agent is preferably dextrin or other amylaceous or mucilaginous element. The materials forming the composition are combined in suitable proportions and from this composition, a retainer is made, which serves to hold or absorb the volatile liquid or oil, and while permitting dissemination thereof, causes the same to be evaporated slowly, whereby on one charge of the liquid or oil, the evaporation extends over a very considerable period of time.

The purpose of my invention is to obtain a composition which can be used for the dissemination of volatile disinfectants, deodorizers and perfumes, which have come into very extensive use, and which material will have no action or injurious effect on the liquids with which it is used.

In forming my composition, I take, for example, plaster of Paris, argillaceous material and dextrin, or other suitable material, in suitable proportions, preferably 32 parts of plaster of Paris, 7 parts of the argillaceous material, and 1 part of the dextrin. In carrying out the manufacture of the container or retainer, these ingredients are thoroughly mixed together by any suitable process, and a saturated solution of the mixture made in water. The material is then poured into a mold or other suitable container of any desired form, and allowed to harden. During the process of hardening, the dextrin or suitable material concentrates at the surface of the body, and the plaster of Paris and argillaceous material remain in the center or as a base, and the dextrin or suitable material serves to retard dissemination. By this means, a porous vessel or retainer is obtained, which is capable of absorbing a relatively large volume of volatile liquid or oil, while the coating or dextrin or other suitable material produces a suitable finish to the surface of the vessel, which, without destroying the absorbent power of the body, serves to suitably close up or fill the pores of said body, in such a manner that, while permitting dissemination from its surface, it controls or regulates the dissemination to prevent a too rapid evaporation of the liquid, so that the maximum duration of the time of evaporation of the liquid is obtained, without injurious effect upon the liquid.

It will be understood that by varying the proportion of the dextrin or other suitable material employed, the duration of evaporation of the liquid may be varied, that is to say, that, at the time of mixing the composition, by increasing or decreasing the amount of dextrin, the time of evaporation may be lengthened or shortened, as desired, to permit slower or faster evaporation, as may be necessary, depending upon conditions. By combining the argillaceous material, such as ocher or another argillaceous earth, the plaster of Paris is held more uniformly in suspension during the molding process, and the containers or retainers are of uniform porosity from the same mixture, though successively cast or molded.

From the above, it will be understood that the proportions above mentioned may be varied according to requirements and conditions, but that the plaster of Paris is always in greater proportion than the argillaceous material and the dextrin.

It will be further understood that the composition is suitable for use with deodorizers, disinfectants, perfumes, essential and aromatic oils.

Having thus described my invention, what I claim as new and desire to secure by Letters Patent, is:—

1. As a new article of manufacture for use as a disseminator for volatile disinfectants, deodorizers and perfumes, consisting of plaster of Paris, argillaceous material, and a substance that will retard dissemination concentrated at the surface of said disseminator, the plaster of Paris being in greater proportion than the argillaceous material and the regulating agent.

2. As a new article of manufacture, a composition for use as a disseminator for volatile disinfectants, deodorizers and perfumes, consisting of plaster of Paris, 32 parts, argillaceous material, 7 parts, and dextrin, 1 part.

3. As a new article of manufacture, a retainer for disseminating volatile disinfectants, deodorizers and perfumes, composed of plaster of Paris and argillaceous material as a base, and a substance that will retard dissemination concentrated at the surface of said base.

4. As a new article of manufacture, a retainer for disseminating volatile disinfectants, deodorizers and perfumes, composed of an absorbent material as a base, and a substance that will retard dissemination concentrated at the surface of said base.

FRANCIS C. BARTON.

Witnesses:
G. HERBERT JENKINS,
J. I. McLEAN.